United States Patent
Vlug

(10) Patent No.: US 8,631,924 B2
(45) Date of Patent: Jan. 21, 2014

(54) CONVEYING DEVICE AND PUSHER SHOE FOR USE IN THE DEVICE

(75) Inventor: Casper Hermanus Gerardus Vlug, Wijk bij Duurstede (NL)

(73) Assignee: Van Riet Equipment B.V., Nieuwegein (NL)

( * ) Notice: Subject to any disclaimer, the term of this patent is extended or adjusted under 35 U.S.C. 154(b) by 90 days.

(21) Appl. No.: 13/263,714

(22) PCT Filed: Apr. 7, 2010

(86) PCT No.: PCT/NL2010/050182
§ 371 (c)(1),
(2), (4) Date: Dec. 27, 2011

(87) PCT Pub. No.: WO2010/117269
PCT Pub. Date: Oct. 14, 2010

(65) Prior Publication Data
US 2012/0085626 A1 Apr. 12, 2012

(30) Foreign Application Priority Data
Apr. 8, 2009 (NL) ................................ 2002729

(51) Int. Cl.
*B65G 47/84* (2006.01)
(52) U.S. Cl.
CPC ...................... *B65G 47/84* (2013.01)
USPC .................................................. 198/370.02
(58) Field of Classification Search
USPC ..................................................... 198/370.02
See application file for complete search history.

(56) References Cited

U.S. PATENT DOCUMENTS

| 5,127,510 A * | 7/1992 | Cotter et al. ............. 198/370.02 |
| 5,909,797 A * | 6/1999 | Van Den Goor ......... 198/370.02 |
| 7,628,265 B2 * | 12/2009 | Verploegen et al. ..... 198/370.02 |
| 7,779,986 B2 * | 8/2010 | Enomoto ................. 198/370.02 |
| 7,857,116 B2 * | 12/2010 | Heit et al. ................ 198/370.02 |
| 2005/0167240 A1 | 8/2005 | Veit et al. |

FOREIGN PATENT DOCUMENTS

| EP | 1371584 A | 12/2003 |
| NL | 9202171 A | 7/1994 |
| WO | 2004092042 A | 10/2004 |
| WO | 2007117142 A2 | 10/2007 |
| WO | 2008041838 A | 4/2008 |

OTHER PUBLICATIONS

International Search Report Dated Sep. 28, 2010, for International Patent Application No. PCT/NL2010/050182.
Written Opinion Dated Sep. 28, 2010, for International Patent Application No. PCT/NL2010/050182.

* cited by examiner

Primary Examiner — Mark A Deuble
(74) Attorney, Agent, or Firm — Graybeal Jackson LLP

(57) ABSTRACT

The invention relates to a conveying device for objects. The device comprises a frame provided with a series of carriers (1) that are movable in a conveying direction, the carriers being aligned parallel to each other with a certain gap and transverse to the conveying direction (A), wherein at least some of the carriers bear pusher shoes (3) that are shiftable along said carriers through the gap. The device is characterized in that the gap between successive carriers is at least partly bridged by gap closure means (50), designed such that a pusher shoe can run through the gap relatively unhindered, while an object other than a pusher shoe is prevented from falling into the gap. The conveying device has less down-time than the known device. The invention also relates to a pusher shoe for use in the device.

34 Claims, 6 Drawing Sheets

CONVEYING DEVICE AND PUSHER SHOE FOR USE IN THE DEVICE

PRIORITY CLAIM

The present invention is a national phase application filed pursuant to 35 USC §371 of International Patent Application Serial No. PCT/NL2010/050182, filed 7 Apr. 2010, which application claims the benefit of Dutch Patent Application No. NL2002729, filed 8 Apr. 2009; all of the foregoing applications are incorporated herein by reference in their entireties.

TECHNICAL FIELD

The invention relates to a conveying device for objects, comprising a frame provided with a series of carriers that are movable in a conveying direction, the carriers being aligned parallel to each other with a certain gap and transverse to the conveying direction, wherein at least some of the carriers bear pusher shoes that are shiftable along said carriers through the gap, using guide means arranged on the frame. The invention also relates to a pusher shoe for use in the device.

Such a device is known from the Dutch patent NL 9202171. The known device is applied for the conveying of objects, wherein objects resting on the moving track can be discharged laterally of the moving track at desired locations by shifting in a determined direction along the carriers a number of pusher shoes which push the relevant object from the moving track transversely of the conveying direction. In this manner the objects can for instance be pushed away laterally onto another track, whereby the objects, for instance parcel post, can be sorted.

BACKGROUND

The increasing quantity of objects for sorting has resulted in a need to further increase the capacity of the known device so that more objects can be sorted per unit of time. This also involves avoiding down time as much as possible. An important source of malfunction relates to the gap that is generally present between adjacent carriers. The gap width should be sufficiently large to allow pusher shoes situated on adjacent carriers to slide past each other. At the transfer locations between different carriers moreover, the carriers of a moving track will be rotated at both ends thereof through 180 degrees round a horizontal rotation axis running parallel to the longitudinal direction of the carriers. In this process of turning around, the carriers at the underside are subject to compression, which tends to close the gap between them, and may damage the carriers or other parts. To avoid such squeezing, a certain minimal gap between the carriers running at the upper side of the conveying belt should be maintained. The necessary gap width in the known device entails the risk of objects falling between the carriers or getting jammed between them. This is a highly undesirable situation since the conveyor needs to be halted in order to remove the objects, which in itself may be cumbersome. Also, the objects may actually cause important damage to the conveyor and possibly also to other objects being conveyed.

SUMMARY

The invention has for its object to provide a conveying device of the type stated in the preamble which does not have, among others, the above stated drawbacks, or does so to lesser extent. The invention further has for its object to provide a pusher shoe for use in the device.

The conveying device according to the invention has for this purpose the features as described in the characterizing part of claim 1. By providing the conveyer device with a gap between successive carriers that is at least partly bridged by gap closure means, designed such that a pusher shoe can run through the gap relatively unhindered, while an object other than a pusher shoe is prevented from falling into the gap, a conveying device with an increased reliability is obtained. An increased reliability means that the average downtime is reduced with respect to the known device. The gaps closure means of the present invention easily deviate horizontally (i.e. in the plane formed by the carrier surfaces) from a closed position to an opened position when a pusher shoe passes the gap closure means, thereby temporarily opening the gap. After passage of the pusher shoe, the gap readily closes again by movement of the gaps closure means back into their closed position. The gap closure means preferably show a low resistance against horizontal movement, and in the meantime provide resistance against movement in the vertical direction. This prevents objects from falling into the gap under the action of gravity. With the conveying device of the invention, a high throughput speed is achievable without running a substantial risk that objects fall or get jammed between gaps. In the context of the present application a high throughput speed is understood to mean a throughput speed of at least 1.5 m per second, preferably at least 2 m per second, more preferably at least 2.5 m per second, most preferably at least 3 m per second.

The gap closure means may extend along the length of the carriers (i.e. in the transverse direction of the conveying device) substantially uninterrupted. Preferred however is a conveying device characterized in that the gap closure means comprise different sections extending transverse to the conveying direction, a section being able to open and close the gap at the section independently from another section. Such embodiment allows a faster closure of the gap closure means after a pusher shoe has slid along it.

The gap closure means provide an essentially 'closed' carrying surface. Preferred conveying devices have a gap width between two successive carriers in the conveying direction of lower than 18 mm, more preferred of lower than 14 mm, and most preferred of lower than 10 mm.

A preferred embodiment of the conveying device according to the invention is provided with gap closure means comprising a gap closure strip, extending transverse to the conveying direction along at least one edge of the successive carriers, and attached to the at least one edge. Suitable materials for the gap closure gap are able to deform such that a pusher shoe may slide along a carrier substantially uninhibited. A particularly preferred material is flexible and has an elastic modulus of lower than 5 GPa, more preferably of lower than 4 GPa, and most preferably of lower than 3 GPa. Most preferred is a rubber, in particular a thermoplastic polyurethane (TPU).

Several configurations of the gap closure means are suitable for bridging the gap between successive carriers. Particularly preferred is a conveying device having a gap closure strip that extends from an edge of a first carrier to the edge opposite the gap of a second carrier. The strip is in this embodiment attached to the edge if the first carrier by any means known in the art, such as by clamping, embedding, adhesive bonding, screwing, sliding, and so on.

Particularly preferred is a conveying device provided with a gap closure strip that extends from an edge of a first carrier to the edge opposite the gap of a second carrier and beyond, such as to partly overlap with the second carrier. Even though such a gap closure means completely covers the gap width (and beyond) the specific characteristics of the pusher shoe and gap closure means of the invention allow a substantially unhindered passage of a pusher shoe along a carrier. Preferably, the part of the gap closure strip that overlaps with part of the second carrier is complementary shaped to said part of the second carrier. In this embodiment, the risk of having objects jamming the gap between two successive carriers is very low. In case such unlikely event would occur, the object is pushed back to the top surface of the carrier and discharged.

A particularly preferred embodiment of the conveying device according to the invention is characterized in that the gap closure means comprise a C-shaped cross-section. More preferably, the lower end of the C-shaped cross-section is hingedly attached to a side edge of a carrier, while the other (top) end is receivable in a recession of the carrier. Such a gap closure means is displaces readily in a substantial horizontal direction (parallel to the top surface of the carriers) from a substantially closed position to a substantially open position, with intermediate positions in between. The hinge at the lower end can be achieved in any known way. By clamping or sliding the lower end in a recession of a carrier for instance, and by using a flexible material, such as a rubber, in particular thermoplastic polyurethane and the like, a natural (springless) hinge is created at the lower end. The hinge function can be tailored at will, preferably by forming the gap closure means out of a co-extruded polymer, the hinge being formed by the softer part of the co-extruded polymer.

The invention also relates to a pusher shoe for use in a device according to the invention. The pusher shoe according to the invention comprises at least one part that extends downwards from the top surface of its carrier along one side edge of the carrier to the bottom surface thereof Such a preferred embodiment allows the reduction of the gap width between successive carriers. Indeed, one part only requires less space between carriers, in particular when two pusher shoes glide past each other. According to the invention, the at least one part comprises a material with a modulus of at least 60 GPa and is thin enough to travel the gap, i.e. is thinner than the gap width.

An even more preferred pusher shoe according to the invention comprises at least two parts that extend downwards from the top surface of its carrier along both side edges of the carrier to the bottom surface thereof, the at least two parts comprising a material with a stiffness modulus of at least 60 GPa and having a thickness of lower than 4 mm each, more preferably lower than 3.6 mm each, and most preferably lower than 3.2 mm. By providing the pusher shoe with the stiff material as well as with the two parts extending downwards (so as to partly enclose the carrier), a desirable level of stiffness and stability is obtained in conjunction with a carrier deck having a reduced gap width between carriers. The two downwardly extending parts of the pusher shoe (its side walls) can indeed be made thin enough allowing travelling a gap that is substantially smaller than known in the state of the art. The smaller gap further allows the equipment of the conveying device with the gap closure means of the invention. Such means are not feasible in the known device with a larger gap width, since the closure means would inhibit operation, and moreover would not be able to 'close' the gap adequately.

The pusher shoes of the conveying device can have any desired form. A typical pusher shoe comprises an engaging part which extends around the relevant carrier and which encloses the carrier as it were, and along which the pusher shoe can be displaced in longitudinal direction of the carrier, and a push body for pushing away the objects laterally which extends above the level of the upper surface of the carrier and is connected to the engaging part.

The pusher shoe according to the invention may comprise any material having a modulus of elasticity of at least 60 GPa, more preferably of at least 110 GPa, even more preferably of at least 150 GPa, even more preferably of at least 180 GPa, and most preferably of at least 210 GPa. Suitable materials include metals, ceramics, fiber reinforced polymers, such as carbon and/or glass reinforced polymers, nanocomposites, and the like. A particularly preferred conveying device comprises a pusher shoe of which the at least one part comprises a metal embedded in a polymer. Such a pusher shoe is mechanically stiff and strong enough, and yet offers freedom of design. Suitable metals include steel, aluminium and/or their alloys. Suitable polymers include but are not limited to wear-resistant polymers, such as for instance polyolefins and/or polyamides.

A particularly preferred conveying device according to the invention is characterized in that the at least one part, and more preferred the at least two parts, of the pusher shoe consists of metal at gap's height. Such a shoe allows the reduction of the gap between successive carriers even more and yet provides the metal-polymer parts of the pusher shoe (which do not extend into the gap in this preferred embodiment) provide the stiffness where it is needed. Another preferred embodiment of the conveying device according to the invention is characterized in that the at least one part, more preferably the at least two parts, of the pusher shoe is complementary shaped to the at least one side edge of the carrier. This allows the reduction of the gap width even further. The side edge of the carrier can be slanted but preferably extends substantially in a perpendicular direction to the top surface thereof.

To facilitate discharge from conveyed objects from the carriers, the conveying device according to the invention is characterized in that at least some of the carriers have an arcuate upper surface in the width direction thereof. Although the radius of curvature of the arcuate upper surface can be selected within broad limits, it is advantageous if it lies between 100-800 mm, more preferably between 150-500 mm, most preferably between 200-300 mm. By giving the upper surface of at least some of the carriers an arcuate form, a more operationally reliable transfer of objects from one moving track to another is achieved.

In order to further aid in stabilizing the pusher shoe when gliding along a carrier, the pusher shoe according to a preferred embodiment is provided with sliding shoes that are movably provided on complementary shaped parts of the carrier.

BRIEF DESCRIPTION OF THE DRAWINGS

The invention will now be further elucidated on the basis of the non-limitative preferred embodiments of a conveying device according to the invention described in the figures. In the figures.

DETAILED DESCRIPTION

Figure 1:
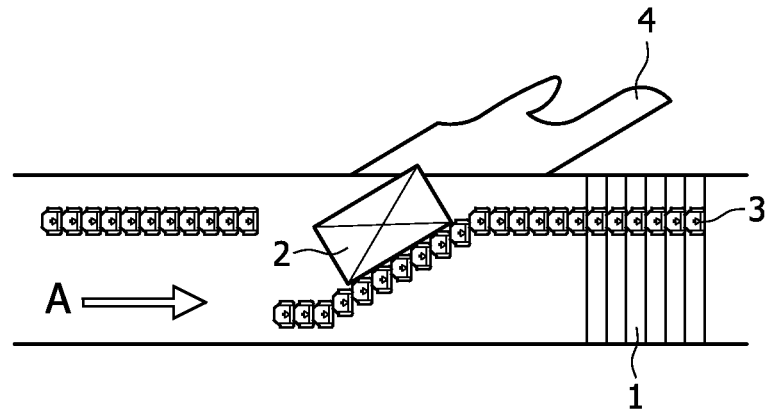
FIGS. 1-3 show schematic top views of an exemplary embodiment of a conveying device according to the state of the art, wherein different stages of the displacement of an object are shown.
Figure 2:
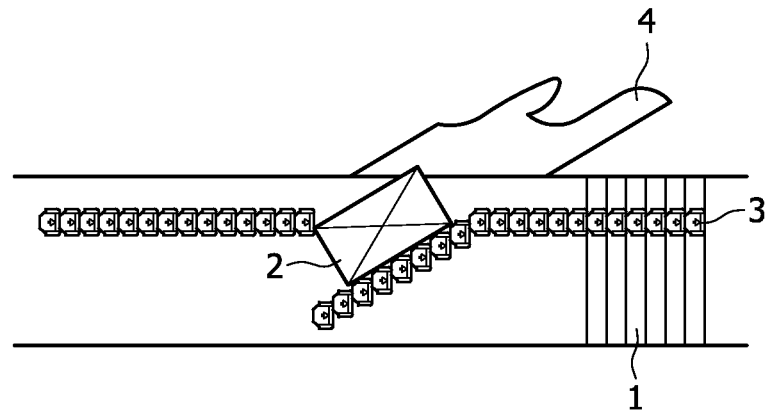
Figure 3:
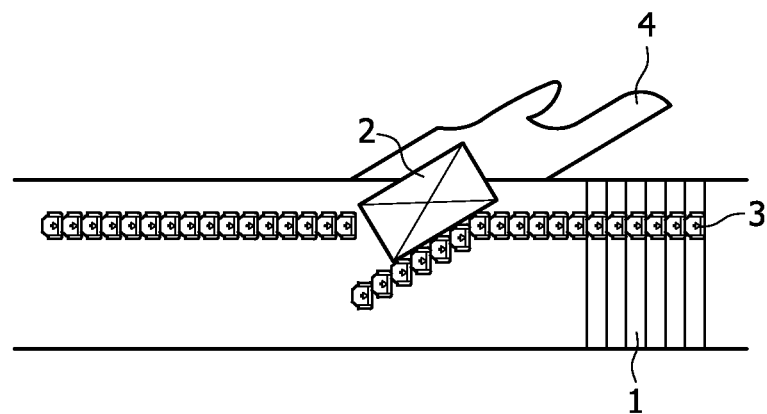

With reference to FIGS. 1 to 3, a conveying device is shown with a series of carriers 1 which run mutually parallel and only several of which are shown in the figures. Using an endless moving track, the carriers 1 are connected to form an endless whole, on the upper surface of which objects 2 can be displaced in the direction A. As indicated in FIG. 1, pusher shoes 3 are coupled to carriers 1, such that they are shiftable relative to carriers 1 in a direction perpendicular to direction A or, in other words, in the longitudinal direction of the carriers 1. Connecting to the sides of the conveying device can be provided discharge chutes 4 (or a second conveying device) and the like, by which objects 2, delivered from the conveying device onto these discharge chutes 4, can be further conveyed. In order to enable pushing of objects 2 to a discharge chute 4, the conveying device is provided at the position of such a discharge chute 4 with means with which a desired number of pusher shoes can be displaced from one side of the conveying device (in FIGS. 1-3 this is the bottom side) to the opposite side of the conveying device. An object 2 is carried along and deposited on discharge chute 4 through displacement of pusher shoes 3.

Figure 4:
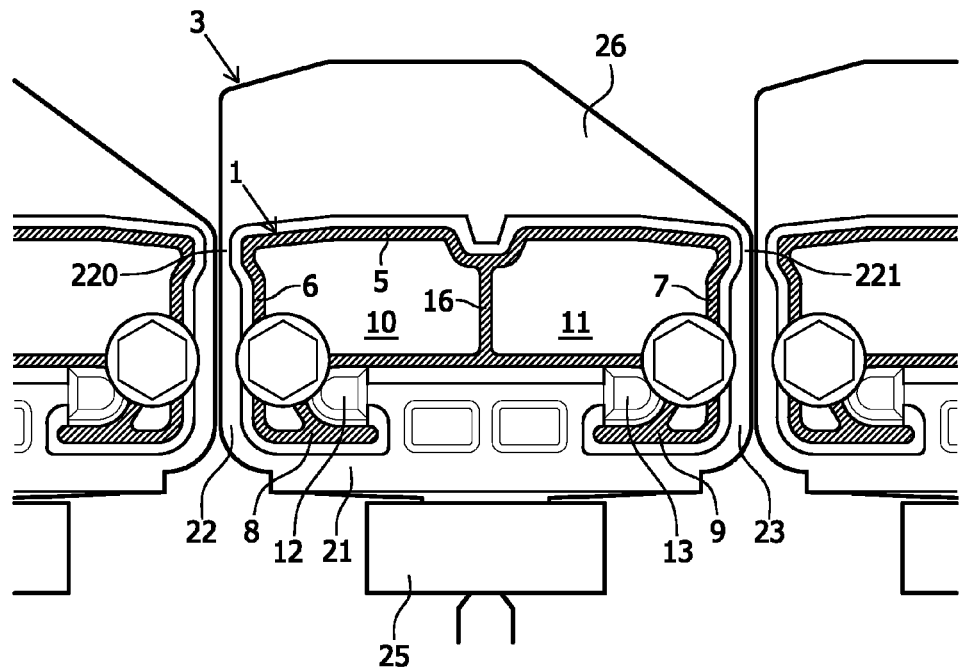
FIG. 4 shows a schematic cross-section of a pusher shoe and carrier according to the state of the art.

Referring to FIG. 4, a carrier 1, provided with a pusher shoe 3 according to the invention is shown. The carrier 1 is generally plank-like and can be an extruded profile for instance, preferably of aluminium, which is provided with an arcuate upper surface 5 for supporting objects to be displaced. The radius of curvature of arcuate upper surface 5 can be chosen within broad limits, this depending on the dimensions and form of the object 2 to be displaced. However, the radius of curvature preferably lies between 100 and 800 mm. Two side walls 6 and 7 running practically parallel to each other in lengthwise direction of carrier 1 connect to upper surface 5. Two substantially U-shaped wall parts 8 and 9, which form inward directed open spaces 10 and 11, are connected to the underside of side walls 6 and 7. The profile is further provided with stiffening ribs 16 in order to give carriers 1 sufficient bending stiffness and mount them on the moving track.

Arranged round the carrier profile is a pusher shoe 3, preferably of a plastic suitable for this purpose. Pusher shoe 3 comprises a base 21, to the longitudinal edges of which connect upright wall parts 22 and 23. Upper wall parts 22, 23 comprise parts 220, 221 at gap's height that essentially consist of a material with a modulus of at least 60 GPa and are thin enough to simultaneously travel the gap 31.

Above upper surface 5 of carrier 1 the pusher shoe 3 is provided with a block-shaped part 26 of almost trapezoidal shape on the rear side thereof (relative to conveying direction A). As further shown in FIG. 4, sliding pieces 12 and 13 are arranged in at least a part of openings 10 and 11 between pusher shoe 3 and carrier 1. These sliding pieces comprise rubber encased in sliding plastic, and provide for a good guiding of pusher shoe 3 over carrier 1, among other reasons because sliding pieces or shoes 12 and 13 are received with sliding fit in complementary shaped parts 8, 9 of carrier 1. The sliding plastic, such as for instance HDPE and/or PTFE, ensures a low frictional resistance between the relatively moving surfaces. The rubber core serves as expansion piece and practically permanent pressure means, wherein use is made of the virtually absent transverse contraction of rubber (Poisson coefficient of about 0.5). Because the play between pusher shoe 3 and carrier 1 falls further due to this measure, rattling and other noise nuisance is reduced. In another variant, the rubber core covered with the plastic is applied as closing piece for an aluminium profile of carrier 1 and/or the moving track, whereby it can serve as end piece. It is advantageous here to have the inner wall of the aluminium profile, which receives the rubber piece, run obliquely relative to the axial direction of the profile so as to prevent accumulation of dirt.

Pusher shoes 3 further comprise a guiding construction 25 which can realize the transverse displacement of pusher shoes 3 in co-action with guide means (not shown) arranged on the frame of the conveying device.

Figure 5:
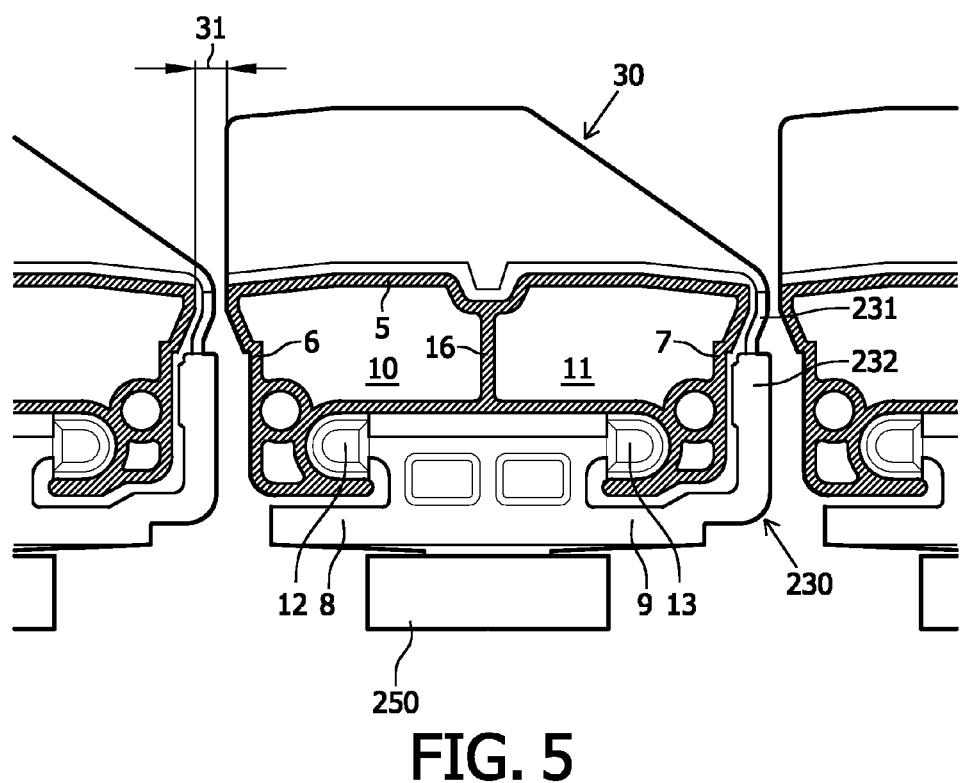
FIG. 5 shows a schematic cross-section of a pusher shoes and carrier according to the invention.

With reference to FIG. 5, another embodiment of a conveying device according to the invention is shown, the device having carriers extending parallel to each other and transverse to the conveying direction A, wherein at least some of the carriers 1 bear pusher shoes 30 which are shiftable along said carriers using guide means 250 arranged on the frame. The embodiment shown in FIG. 5 comprises a pusher shoe 30 of which the part 230 is complementary shaped to the at least one side edge 7 of the carrier 1. By providing a pusher shoe according to the invention, the gap 31 between two successive carriers 1 in the conveying direction A can be lower than known hitherto, and is preferably lower than 18 mm, more preferably lower than 14 mm, and most preferably lower than 10 mm. Part 230 comprising a material with a modulus of at least 60 GPa and is thin enough to travel the gap 31. The pusher shoe 30 according to the invention is essentially U-shaped, in other words has one side which is substantially open.

The parts 230, 22 and/or 23 of the pusher shoe 30 comprise a metal part 231, 220 and/or 221 respectively, which metal part is at least partly embedded in a polymer part 232, 22, 23. The preferred embodiment shown in FIG. 5 has a part 230, a cross-section thereof consisting of metal 231 only at gap's height. This allows making the gap 31 extremely small, and yet providing the shoe 30 with the desired stiffness. It should be noted that metal parts 231, 220, and 221 need not be metal solely along the entire length of the carrier 1 (i.e. in the transverse direction of the conveying device). On the contrary, it is preferred to provide the metal parts 231, 220 and 221 with tapered polymer parts at the end. Such polymer parts aid in opening up the gap closure means, described in more detail below.

Figure 6:
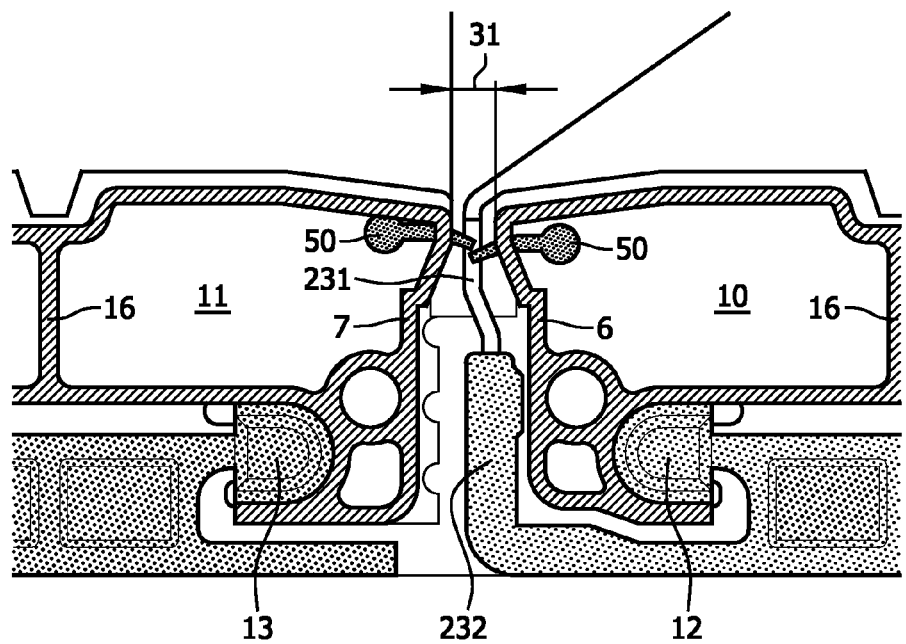
FIG. 6 schematically shows a detail of a cross-section of another embodiment of a pusher shoe and carrier according to the invention.
Figure 7:
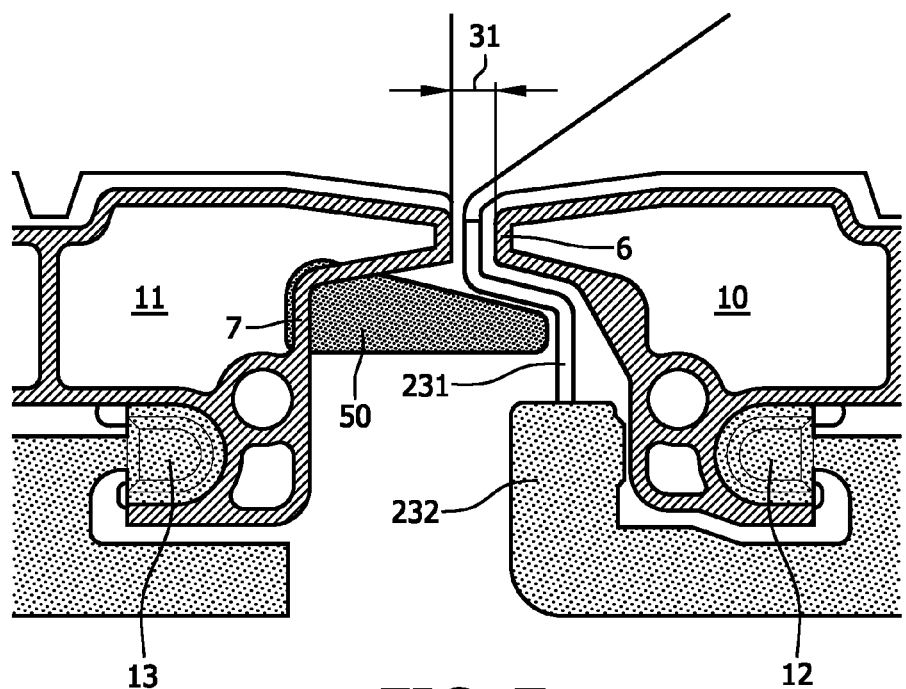
FIG. 7 schematically shows a detail of a cross-section of still another embodiment of a pusher shoe and carrier according to the invention.

According to the invention, the embodiment shown in FIG. 6 comprises gap closure means in the form of gap closure strips 50 of deformable material, extending transverse to the conveying direction along at least one edge 6, 7 of successive carriers 1, and bridging the gap 31 between said carriers at least partly. The deformable material preferably has an elastic modulus of lower than 5 GPa, such as a rubber. In the embodiment shown in FIG. 7 the gap closure strip 50 extends from an edge 7 of a first carrier 1 to the edge 6 opposite the gap 31 of a second carrier 1. As is shown, the gap closure strip 50 extends from an edge 7 of a first carrier 1 to the edge 6 opposite the gap 31 of a second carrier 1 and beyond, such as to partly overlap with the second carrier 1. The overlapping part of the gap closure strip 50 is complementary shaped to said part of the second carrier 1.

Referring to FIGS. 8A to 8E, several embodiments of the gap closing means 50 of the conveying device according to the invention are shown. In FIG. 8 the gap closure means are formed by complementary shaped parts 6 and 7 of two adjacent carriers 1. Parts 6 and 7 overlap such as to form a gap closure, at least in the vertical direction.

Figure 8A:
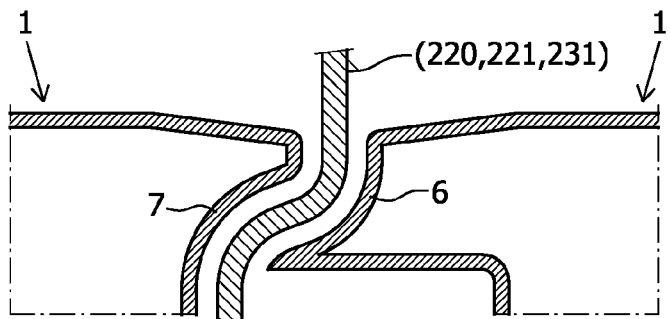
FIGS. 8A to 8E schematically show several embodiments of the gap closing means of the conveying device according to the invention.
Figure 8B:
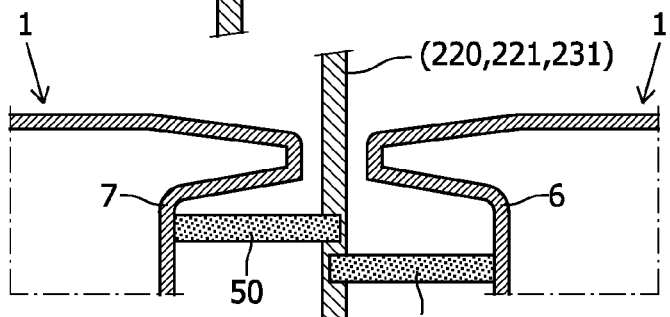

In FIG. 8B, the gap closure means comprise two flexible strips 50, extending from the side edges 6, 7 of two adjacent carriers 1, and attached thereto. The two strips 50 partly overlap at their free edge.

Figure 8C:
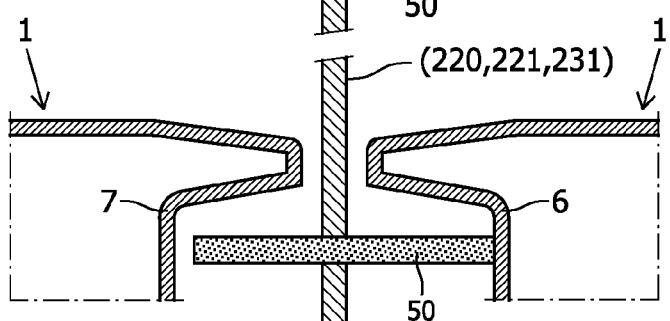

In FIG. 8C, the gap closure means comprise one flexible strip 50, extending from one side edges 6 of two adjacent carriers 1, and attached thereto. The strip 50 extends over substantially the entire gap 31.

Figure 8D:
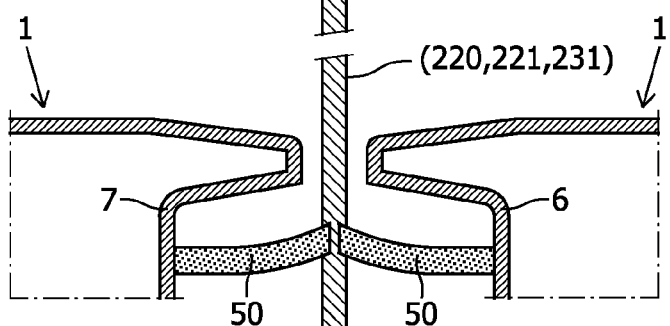
Figure 8E:
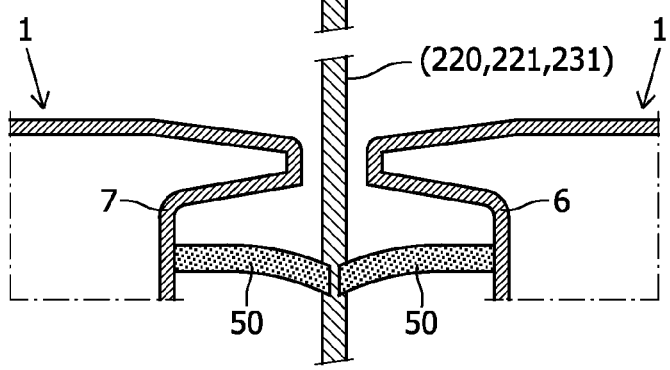

In FIGS. 8D and 8E, the gap closure means comprise two flexible strips 50, extending from two side edges 6,7 of two adjacent carriers 1, and attached thereto. The strips 50 do not overlap at their free ends but are curved for better closure. The embodiment shown in FIG. 8E has the additional advantage that dirt is carried away easily, due to the downward curvature of the two strips 50. It should be noted that the embodiments shown are mere examples and other geometrical shapes may be envisaged within the inventive concept without exercising any inventive skills.

Figure 9:
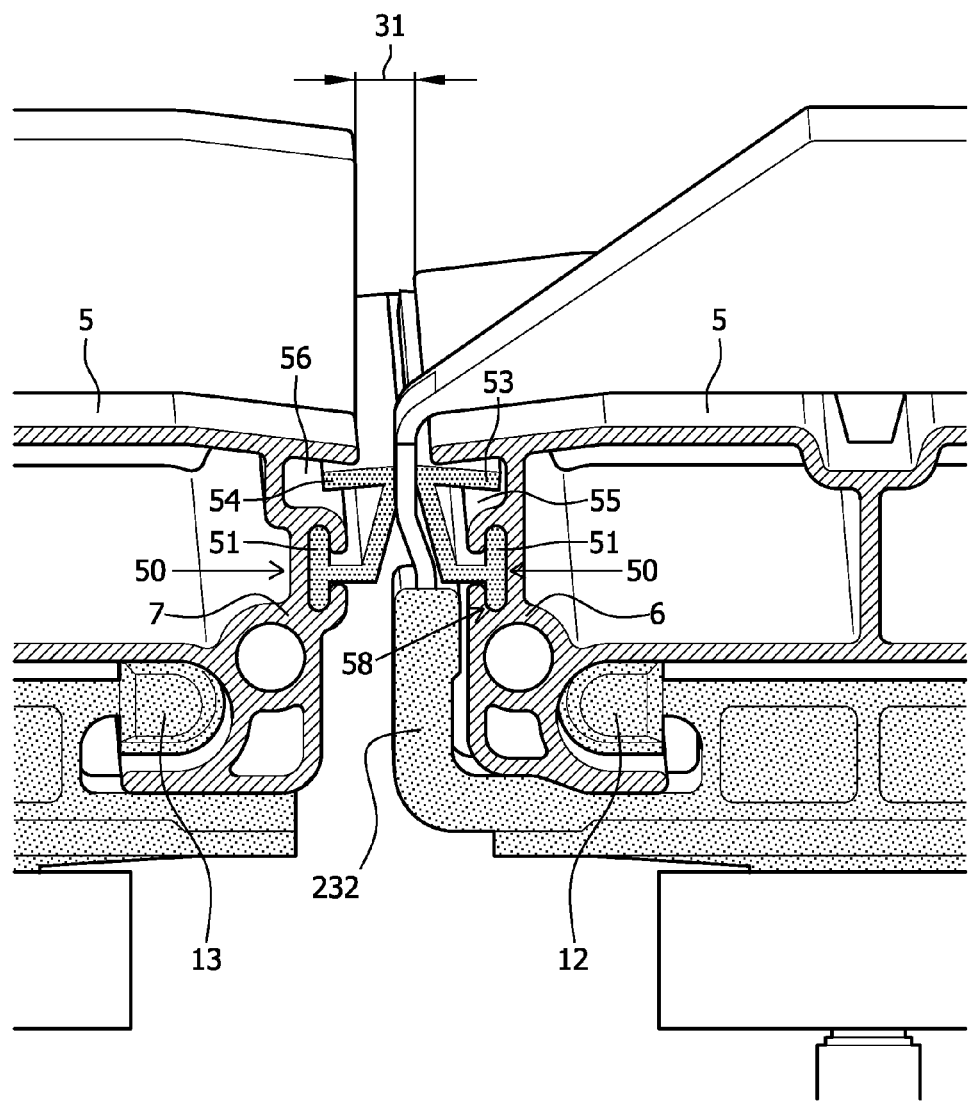
FIG. 9 schematically shows a perspective view of a preferred embodiment of the gap closing means of the conveying device according to the invention; while finally FIG. 10 schematically shows a detail of the gap closing means of FIG. 9.
Figure 10:
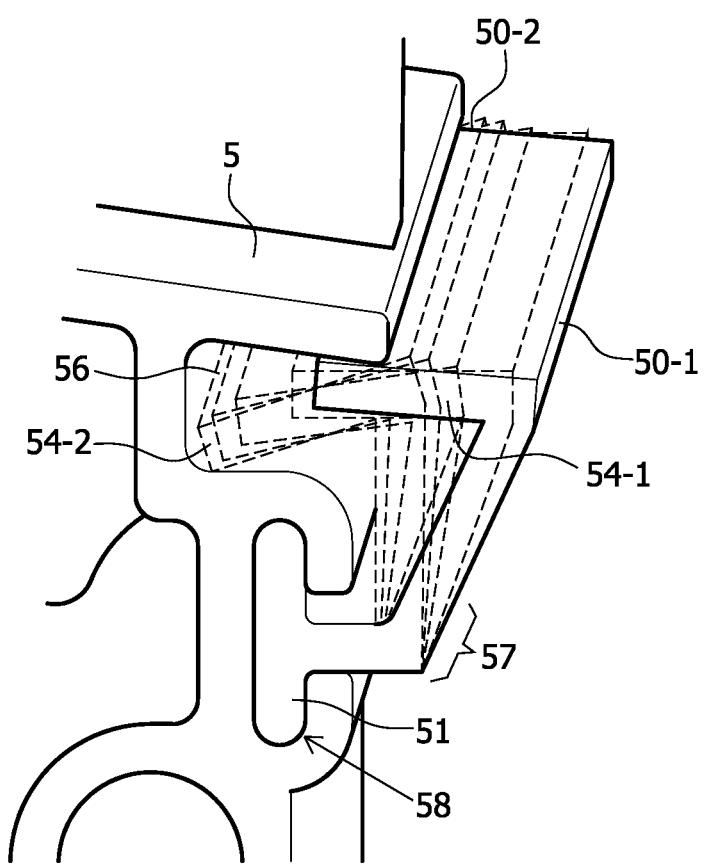

A particularly preferred embodiment is shown in FIGS. 9 and 10. A conveying device is shown with adjacent carriers, each provided with gap closure means comprising an elongated strip of material 50 with a C-shaped cross-section for each carrier. In the closed position, the two strips 50 contact each other at their top ends (53, 54) with a certain pre-tension, preferably. The lower end (51, 52) of the C-shaped cross-section is hingedly attached to a side edge (6, 7) of a carrier 1. The other (top) end (53, 54) is receivable in a recession (55, 56) of the carrier. This arrangement allows the gaps closure means 50 to displace in a substantial horizontal direction (parallel to the top surface 5 of a carrier 1), as shown in FIG. 10 in detail for a number of different position, ranging from a substantially closed position 50-1 to a substantially open position 50-2, with intermediate positions in between. The hinge at the lower end can be achieved in any known way. By firmly clamping part 51 in a recession 58 of carrier 1, and by using a flexible material, such as a rubber, in particular thermoplastic polyurethane and the like, a natural (springless) hinge is created at position 57. The hinge function can be tailored at will, preferably by forming the gap closure means out of a co-extruded polymer, the hinge being formed by the softer part of the co-extruded polymer. It is also possible to provide a local wall thickness reduction at position 57 to form the hinge. The present embodiment—having a hinging part—is particularly preferred since it can be made of a stiffer material than the embodiments shown in FIGS. 7, 8A to 8E. Indeed, it is possible to even use metals such as aluminium and steel. For reduction of noise reasons, polymers such as polyolefines, thermoplastic polyurethanes are preferred. The present preferred embodiment easily deviates horizontally from its closed position 50-1 to its opened position 50-2 when a pusher shoe passes the gap closure means, thereby temporarily opening the gap 31. After passage of the pusher shoe, the gap 31 readily closes again by movement of the gaps closure means 50 back into their closed position 50-1. Due to its specific design, the present preferred embodiment shows a low resistance against horizontal movement, and in the meantime provides a high resistance against movement in the vertical direction. This prevents objects from (free) falling into the gap 31.

For reason of clarity, the embodiments shown in the figures all have pusher shoes comprising one part that extends downwards from the top surface of its carrier along one side edges of the carrier to the bottom surface thereof. It is expressly noted however that pusher shoes comprising two parts extending downwards from the top surface of its carrier along both side edges of the carrier to the bottom surface thereof are within the scope of the present invention.

The invention claimed is:

1. Conveying device for objects, comprising a frame provided with a series of carriers that are movable in a conveying direction, the carriers being aligned parallel to each other with a certain gap and transverse to the conveying direction, wherein at least some of the carriers bear pusher shoes that are shiftable along said carriers through the gap, wherein the gap between successive carriers is at least partly bridged by gap closure means, designed such that a pusher shoe can run through the gap relatively unhindered, while an object other than a pusher shoe is prevented from falling into the gap, and wherein the gap closure means deviate in the plane formed by the carrier surfaces from a closed position to an opened position when a pusher shoe passes the gap closure means, thereby temporarily opening the gap, and move back into their closed position after passage of the pusher shoe.

2. Conveying device according to claim 1, wherein the gap closure means comprise different sections extending transverse to the conveying direction, a section being able to open and close the gap at the section independently from another section.

3. Conveying device according to claim 1 or 2, wherein the gap closure means comprise a gap closure strip, extending transverse to the conveying direction along at least one edge of the successive carriers, and attached to the at least one edge.

4. Conveying device according to claim 3, wherein the gap closure strip extends from an edge of a first carrier to the edge of a second carrier opposite the gap.

5. Conveying device according to claim 3, wherein the gap closure strip extends from an edge of a first carrier to the edge of a second carrier opposite the gap and beyond, such as to partly overlap with the second carrier.

6. Conveying device according to claim 5, wherein the part of the gap closure strip that overlaps with part of the second carrier is complementary shaped to said part of the second carrier.

7. Conveying device according to claim 1 or 2, wherein the gap closure means comprise a C-shaped cross-section.

8. Conveying device according to claim 7, wherein the lower end of the C-shaped cross-section is hingedly attached to a side edge of a carrier, while the other (top) end is receivable in a recession of the carrier.

9. Conveying device according to claim 1 or 2, wherein the gap closure means comprise a flexible material, such as a rubber.

10. Conveying device according to claim 1 or 2, wherein the gap closure means comprise a co-extruded polymer.

11. Conveying device according to claim 1 or 2, wherein the gap closure means are hingedly attached to an edge of a carrier and comprise a co-extruded polymer, the hinge being formed by the softer part of the co-extruded polymer.

12. Conveying device according to claim 1 or 2, wherein the gap between successive carriers in the conveying direction is lower than 18 mm, more preferably lower than 14 mm, and most preferably lower than 10 mm.

13. Pusher shoe for use in a conveying device having gap closure means according to claim 1, the pusher shoe comprising at least two parts that extend downwards from the top surface of its carrier along both side edges of the carrier to the bottom surface thereof, the at least two parts comprising a material with a modulus of at least 60 GPa and having a thickness that is small enough to be able to run substantially unhindered through the gap between successive carriers.

14. Pusher shoe according to claim 13, wherein the thickness of the at least two parts is lower than 4 mm each, more preferably lower than 3.6 mm each, and most preferably lower than 3.2 mm.

15. Pusher shoe according to claim 13 or 14, wherein the at least two parts of the pusher shoe are complementary shaped to the corresponding side edge of the carrier.

16. Pusher shoe according to any one of claims 13 or 14, wherein the at least two parts of the pusher shoe comprise a metal embedded in a polymer.

17. Pusher shoe according to any one of claims 13 or 14, wherein a cross-section of the at least two parts of the pusher shoe consists solely of metal at gap's height.

18. Pusher shoe according to any one of claims 13 or 14, wherein the pusher shoe is provided with sliding shoes that are movably provided on complementary shaped parts of the carrier.

19. Conveying device according to claim 1, wherein a pusher shoe comprises at least two parts that extend downwards from the top surface of its carrier along both side edges of the carrier to the bottom surface thereof, the at least two parts comprising a material with a modulus of at least 60 GPa and having a thickness that is small enough to be able to run substantially unhindered through the gap between successive carriers.

20. Conveying device according to claim 19, wherein the thickness of the at least two parts is lower than 4 mm each, more preferably lower than 3.6 mm each, and most preferably lower than 3.2 mm.

21. Conveying device according to claim 19 or 20, wherein the at least two parts of the pusher shoe are complementary shaped to the corresponding side edge of the carrier.

22. Conveying device according to claim 19 or 20, wherein the at least two parts of the pusher shoe comprise a metal embedded in a polymer.

23. Conveying device according to claim 19 or 20, wherein a cross-section of the at least two parts of the pusher shoe consists solely of metal at gap's height.

24. Conveying device according to claim 19 or 20, wherein the pusher shoe is provided with sliding shoes that are movably provided on complementary shaped parts of the carrier.

25. Gap closure means, designed such that a pusher shoe of a conveying device, comprising a frame provided with a series of carriers that are movable in a conveying direction, the carriers being aligned parallel to each other with a certain gap and transverse to the conveying direction, wherein at least some of the carriers bear pusher shoes that are shiftable along said carriers through the gap, can run through the gap relatively unhindered, while an object other than a pusher shoe is prevented from falling into the gap, wherein the gap closure means are configured to deviate in the plane formed by the carrier surfaces from a closed position to an opened position when a pusher shoe passes the gap closure means, thereby temporarily opening the gap, and move back into their closed position after passage of the pusher shoe.

26. Conveying device for objects, comprising a frame provided with a series of carriers that are movable in a conveying direction, the carriers being aligned parallel to each other with a certain gap and transverse to the conveying direction, wherein at least some of the carriers bear pusher shoes that are shiftable along said carriers through the gap, wherein the gap between successive carriers is at least partly bridged by gap closure means, designed such that a pusher shoe can run through the gap relatively unhindered, while an object other than a pusher shoe is prevented from falling into the gap, and wherein the gap closure means comprise different sections extending transverse to the conveying direction, a section being able to open and close the gap at the section independently from another section.

27. Conveying device according to claim 26, wherein the gap closure means comprise a gap closure strip, extending transverse to the conveying direction along at least one edge of the successive carriers, and attached to the at least one edge.

28. Conveying device according to claim 27, wherein the gap closure strip extends from an edge of a first carrier to the edge of a second carrier opposite the gap.

29. Conveying device according to claim 27, wherein the gap closure strip extends from an edge of a first carrier to the edge of a second carrier opposite the gap and beyond, such as to partly overlap with the second carrier.

30. Conveying device according to claim 29, wherein the part of the gap closure strip that overlaps with part of the second carrier is complementary shaped to say part of the second carrier.

31. Conveying device according to claim 26, wherein the gap closure means comprises a C-shaped cross-section and wherein the lower end of the C-shaped cross-section is hingedly attached to a side edge of a carrier, while the other (top) end is receivable in a recession of the carrier.

32. Conveying device according to claim 26, wherein the gap closure means comprise a flexible material, such as a rubber.

33. Conveying device according to claim 26, wherein the gap closure means comprise a co-extruded polymer.

34. Conveying device according to claim 26, wherein the gap closure means are hingedly attached to an edge of a carrier and comprise a co-extruded polymer, the hinge being formed by the softer part of the co-extruded polymer.

* * * * *